United States Patent
Robbrecht

(10) Patent No.: US 11,173,640 B2
(45) Date of Patent: Nov. 16, 2021

(54) METHOD FOR MANUFACTURING A POLYMER ARTICLE

(71) Applicant: Keiryo Packaging SA, Luxembourg (LU)

(72) Inventor: Johan Robbrecht, Sint-Pieters-Kapelle (BE)

(73) Assignee: KEIRYO PACKAGING SA, Luxembourg (LU)

( * ) Notice: Subject to any disclaimer, the term of this patent is extended or adjusted under 35 U.S.C. 154(b) by 375 days.

(21) Appl. No.: 15/740,995

(22) PCT Filed: Jul. 11, 2016

(86) PCT No.: PCT/EP2016/066442
§ 371 (c)(1),
(2) Date: Dec. 29, 2017

(87) PCT Pub. No.: WO2017/005935
PCT Pub. Date: Jan. 12, 2017

(65) Prior Publication Data
US 2018/0354167 A1 Dec. 13, 2018

(30) Foreign Application Priority Data
Jul. 9, 2015 (EP) .................................. 15176179

(51) Int. Cl.
*B29C 45/22* (2006.01)
*B29C 45/00* (2006.01)
(Continued)

(52) U.S. Cl.
CPC .......... *B29C 45/0001* (2013.01); *B29C 45/14* (2013.01); *B29C 48/022* (2019.02);
(Continued)

(58) Field of Classification Search
CPC ................. B29C 45/0046; B29C 2045/0051
(Continued)

(56) References Cited

U.S. PATENT DOCUMENTS 4,237,089 A * 12/1980 Kubat ................. B29C 45/0001
264/328.1
4,327,050 A 4/1982 Salmon
(Continued)

FOREIGN PATENT DOCUMENTS

EP 0 308 088 3/1989
EP 0 672 081 6/1994
(Continued)

OTHER PUBLICATIONS

He, "Crystallization of Polypropylene, Nylon-66 and PET at pressures to 200MPa", Journal of Polymer Science, 1994 (Year: 1994).*
(Continued)

*Primary Examiner* — Jacob T Minskey
(74) *Attorney, Agent, or Firm* — Edwin A. Sisson, Attorney at Law, LLC; Jeffrey J. Banyas

(57) ABSTRACT

A method enabling the selection, modification and/or creation of polymer materials which can provide improved response to the application of local shear and/or extensional deformation inside the polymer melt in manufacturing technologies including injection molding, injection stretch blow molding, direct injection, extrusion blow molding, sheet extrusion, thermoforming, etc., is provided. A method for manufacturing a polymer article includes injecting or extruding molten polypropylene, polyethylene or polyester based polymer for converting it into semi-final shape while applying shear and/or extensional deformation on the polymer melt. Applying shear and/or extensional deformation on the polymer melt includes selectively modifying the flow path of the molten semi-crystallizable polymer as a function
(Continued)

Figure 1:
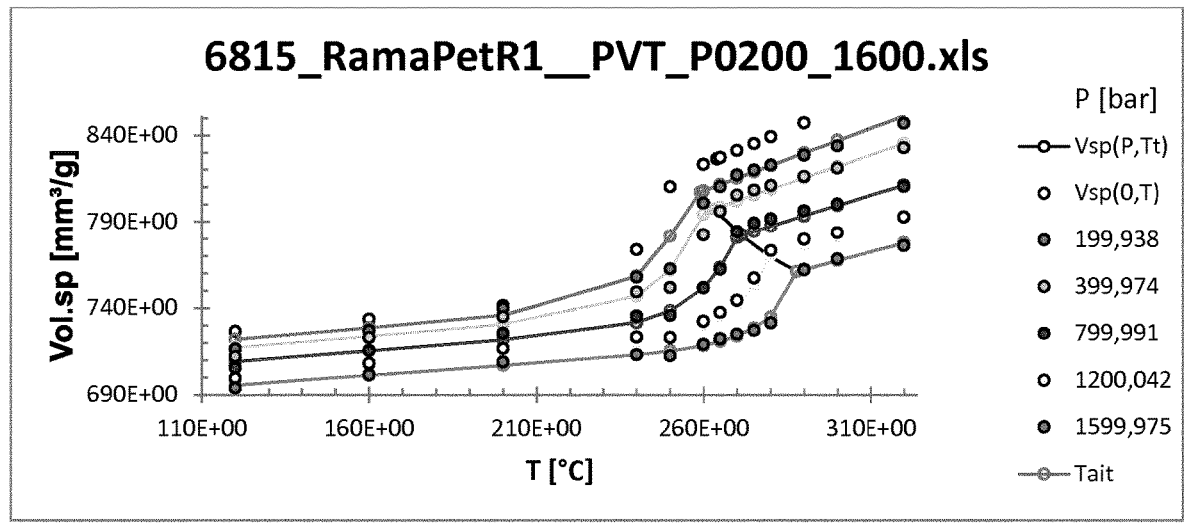

of local pressure profile over at least part of the flow path. Local pressure profile is a function of optimized response of the polymer melt to the applied local shear and/or extensional deformation over at least the part of the flow path.

20 Claims, 1 Drawing Sheet

(51) Int. Cl.
| | |
|---|---|
| B29C 48/00 | (2019.01) |
| B29C 48/31 | (2019.01) |
| B29C 49/00 | (2006.01) |
| B29C 48/92 | (2019.01) |
| B29C 48/695 | (2019.01) |
| B29C 48/08 | (2019.01) |
| B29C 45/14 | (2006.01) |
| C08L 23/06 | (2006.01) |
| C08L 23/12 | (2006.01) |
| C08L 67/00 | (2006.01) |
| B29K 67/00 | (2006.01) |
| B29K 23/00 | (2006.01) |

(52) U.S. Cl.
CPC .............. *B29C 48/08* (2019.02); *B29C 48/31* (2019.02); *B29C 48/695* (2019.02); *B29C 48/92* (2019.02); *B29C 49/0005* (2013.01); *C08L 23/06* (2013.01); *C08L 23/12* (2013.01); *C08L 67/00* (2013.01); *B29C 2045/0098* (2013.01); *B29C 2948/92* (2019.02); *B29C 2948/92019* (2019.02); *B29C 2948/92104* (2019.02); *B29C 2948/92409* (2019.02); *B29C 2948/92514* (2019.02); *B29C 2948/92904* (2019.02); *B29K 2023/06* (2013.01); *B29K 2023/12* (2013.01); *B29K 2067/00* (2013.01)

(58) Field of Classification Search
USPC .................................. 264/504, 500; 428/159
See application file for complete search history.

(56) References Cited

U.S. PATENT DOCUMENTS

| | | | | |
|---|---|---|---|---|
| 5,252,268 | A | | 10/1993 | Ohno |
| 6,326,434 | B1 | * | 12/2001 | Lee .......................... C08L 23/04 525/192 |
| 2010/0035009 | A1 | * | 2/2010 | Radermacher .......... C08L 23/10 428/36.92 |

FOREIGN PATENT DOCUMENTS

| | | |
|---|---|---|
| EP | 1 073 551 | 10/1999 |
| EP | 1 268 574 | 8/2001 |
| EP | 1 711 557 | 8/2005 |
| WO | WO 02/36324 | 5/2002 |
| WO | WO 2006/114118 | 11/2006 |
| WO | WO 2008/145746 | 12/2008 |
| WO | WO 2010/060641 | 6/2010 |

OTHER PUBLICATIONS

Gupta, V.B. et al., "Chapter 7. PET Fibers, Films, and Bottles," in Handbook of Thermoplastic Polyesters: Homopolymers, Copolymers, Blends, and Composites, 2002, pp. 317-388. (Year: 2002).*

Van Erp, Tim B. et al., "Quantification of non-isothermal, multiphase crystallization of isotactic polypropylene: The influence of shear and pressure," Polymer, vol. 53, No. 25, Nov. 1, 2012, pp. 5896-5908. (Year: 2012).*

Sanches, N.B. et al., Comparative techniques for molecular weight evaluation of poly (ethylene terephthalate) (PET), Polymer Testing, vol. 24, Issue 6, Sep. 2005, pp. 688-693. (Year: 2005).*

Gupta, V.B. et al., "Chapter 7. PET Fibers, Films, and Bottles," in Handbook of Thermoplastic Polyesters Homopolymers, Copolymers, Blends, and Composites, 2002, pp. 317-388.

Sanches, N.B. et al., Comparative techniques for molecular weight evaluation of poly (ethylene terephthalate) (PET), Polymer Testing, vol. 24, Issue 6, Sep. 2005, pp. 688-693.

Van Erp, Tim B. et al., "Quantification of non-isothermal, multiphase crystallization of isotactic polypropylene: The influence of shear and pressure," Polymer, vol. 53, No. 25, Nov. 1, 2012, pp. 5896-5908.

Vlachopoulos, J. et al., "Polymer Processing," Materials Science and Technology, vol. 19, No. 1, Sep. 1, 2003, pp. 1161-1169.

Sentmanat, M.L., "Miniature universal testing platform: From extensional melt rheology to solid-state deformation behavior," Rheol. Acta 43, pp. 657-669 (2004).

Sentmanat, M. et al., "Measuring the transient extensional rheology of polyethylene melts using the SER universal testing platform," J. Rheol., 49 (3), pp. 585-606 (2005).

Sunthar, P., "Polymer Rheology," in "Rheology of Complex Fluids," Jan. 1, 2010, pp. 171-191.

Wang, Jian, "PVT Properties of Polymers for Injection Molding," in "Some Critical Issues for Injection Molding," Mar. 23, 2012.

Pantini, Roberto et al., "Fibrillar Morphology in Shear-Induced Crystallization of Polypropylene," Macromolecular Materials and Engineering, vol. 299, No. 12, Dec. 8, 2014, pp. 1465-1467.

ISO 6721-10:1997, "Plastics—Determination of dynamic mechanical properties—Part 10: Complex shear viscosity using a parallel-plate oscillatory rheometer" (rev. 1999).

ASTM D1238-10, "Standard Test Method for Melt Flow Rates of Thermoplastics by Extrusion Plastometer" (2010).

ISO 1133, "Plastics—Determination of the Melt Mass-Flow Rate (MFR) and Melt Volume Flow Rate (MVR) of Thermoplastics" (2005).

* cited by examiner

METHOD FOR MANUFACTURING A POLYMER ARTICLE

FIELD OF THE INVENTION

The present invention relates in general to new developments in the manufacturing of thermoplastic articles.

BACKGROUND OF THE INVENTION

The commercial success of plastics, especially as a packaging product, is due to a combination of flexibility (from film and bags to rigid trays and containers), strength, lightness, stability, impermeability and ease of sterilization. These features make plastics an ideal packaging material for all sorts of commercial and industrial users. For instance in food packaging, plastics are widely used since commonly it does not affect the taste and quality of the food and the barrier properties of plastics ensure that food keeps its natural taste while protecting it from external contamination.

Several types of plastics have been used, ranging from aliphatic and aromatic polyolefins (polyethylene, polypropylene, polystyrene) over halogenated polymers (polyvinyl chloride, polyvinylidene chloride (PVDC)) and aliphatic polyamides (nylons) to aromatic polyesters. As far as the rigid food and beverage packaging sector is concerned, polyethylene terephthalate (PET), an aromatic polyester, is by far the most widely used resin, followed by polypropylene (PP) and polyethylene (PE).

The packaging supply chain in general, and the polymer packaging supply chain in specific, is being continuously challenged for increasing its overall sustainability through a reduction of its carbon footprint. In turn, this mandates amongst others an ongoing reduction of raw material consumption whilst maintaining the overall functional performances of these light-weighted polymer articles.

At the same time, the (polymer) packaging supply chain is facing important profitability challenges, which requires access to cost-efficient packaging manufacturing technologies which can accommodate both these ecological and economical challenges simultaneously. This is often being referred to as the "3BL principle": the "triple bottom line" stating that improvements should be beneficial for all stakeholders (People, Planet, Profit)

The present invention can provide a substantial contribution to achieving a more favorable 3BL within the (polymer) packaging supply chain.

One such area where this 3BL challenge is clearly visible concerns the use of containers made of diverse types of polymer materials, such as but not limited to containers made from polyester-based, polypropylene-based and polyethylene-based polymers for use across a wide range of both food, and non-food applications.

Examples may include, without being limitative, eg. the use of polymer based containers for consumer (non-) carbonated beverage applications, packaged food products, non-food household products, cosmetic or toiletry products, dairy products, films, bags, . . . .

Such polymer articles in general, or containers in specific may be produced through different manufacturing technologies, such as—without being exclusive—injection molding (IM), injection stretch blow molding (ISBM), direct injection (DI), extrusion blow molding (EBM), sheet extrusion, thermoforming, etc.

Across all of these applications, the key challenge has become to do "more with less", meaning either maintaining the overall performance specifications at a total lower polymer weight, or achieving improved performances at an equivalent polymer weight. This reduced polymer material consumption will contribute importantly to both the ecological sustainability (reduced $CO_2$ emissions, . . . ) as well as the economic benefits (reduced raw material costs, less transportation costs, less waste handling costs, . . . ) of the (polymer) packaging supply chain, provided that these improvements are achievable at either no or at an acceptable increased operational cost.

In turn, this requires an improved utilization or effectiveness from the polymer material itself, without reverting to highly sophisticated, and hence expensive, material and/or manufacturing converting technologies.

WO2008145746, the whole text being incorporated in this text by reference, addresses the problem that resin, oil and energy pricing has created significant pressure on package owners to reduce the total cost of ownership of their plastic packaging mix, and attempts among others to further reduce the wall thickness of these plastic (like PET) containers (light-weighting) whilst maintaining the inherent overall performance characteristics and design flexibility. The text describes the principle of Flow Induced Crystallization, which teaches about the ability to modify the internal morphologic structure of a (semi-)crystallizable polymer by introducing a controlled local strain (shear) onto the polymer melt. The text further discloses an injection and stretch blow molding method for making a container wherein controlled local friction or shear is applied through the introduction of modifications inside the hot runner system, through which pre-alignment/orientation of macromolecules in the polymer melt are induced and through which the desired performance improvements might be obtained.

However, WO2008145746 lacks any teaching with regards to the either the responsiveness of various polymer material categories to the application of local shear, nor the minimal shear exposure which would be required, nor on any mechanism to either select and/or modify existing and/or create new polymers which would more optimally react to the application of controlled shear inside the polymer melt.

Further, although most of the polymer processing operations considered in WO2008145746 are dominated by shear deformations, the document lacks any teaching with regards to the fact that any contracting, diverging, or squeezing types of flow that commonly occur during those polymer processing and shaping operations also involve extensional deformations. Hence, while most of the emphasis involving the deformation of polymeric materials in WO2008145746 focused on aspects relating to shear deformations, a more rigorous analysis of the melt processing technologies described therein would also consider aspects relating to extensional deformations. Extensional deformations are characterized by elongation flows which tend to align, stretch and orient polymer chains in the melt. Similar to flows in shear, extensional flows can also generate flow induced crystallization during melt processing.

As such, at present, it is impossible to make any predictive assessment and subsequent selection in-between and across various polymer material categories as to the minimal required shear exposure or minimal required exposure to extensional deformation, or most suitable polymer for use in applications leveraging Flow Induced Crystallization.

Therefore, it is an object of the present invention to provide a method which enables the selection of the most suitable polymer materials for their response to the application of Flow Induced crystallization in polymer manufacturing technologies In addition, it is an object of the present invention to provide a method for modifying existing and/or creating new polymer resin compositions which provide an optimal response to the application of local shear and/or extensional deformation inside the polymer melt.

Further, it is also an object of the present invention to provide a method obtaining higher container volumes for a given used polymer weight compared to the state of the art. Moreover, the method of the present invention may achieve articles, in particular containers with equal or higher overall functional performances compared to state of the art articles, in particular containers, having the same or higher polymer weight.

Still another object is to reduce design constraints with regards to the neck opening in the manufacturing of high volume containers.

The method of the present invention may as another objective also result in containers less suffering from shrinkage and/or visual crystallization upon heat exposure, for example in hot-fill applications, compared to the state of the art.

It is further another object of the present invention to provide a method for manufacturing a polymer container, in particular a preform and resulting stretch blow molded container, having reducing packaging cost by enabling higher bottle volume at same preform weight.

Another object of the present invention may be the increased functional performance of injected polymer articles across diverse end use applications (primary, secondary & tertiary packaging, building & construction, automotive, electric & electronics), demonstrating functional improvements including but not limited to: better dimensional stability (eg less warpage, leading to less quality defects), better gas and/or water barrier (avoiding need for secondary barrier packaging), higher impact resistance, or higher thermal resistance.

Still another object of the present invention is to provide a method for manufacturing extruded articles, in particular sheets and blown films with improved molecular orientation prior to exiting the extrusion die that would relieve the limitations of drawing the extruded material upon exiting the die and the known processing instabilities associated therewith. Moreover, the improved molecular orientation during extrusion would further enhance the flow induced crystallization behavior of the sheet and film articles being extruded and drawn.

Another object of the present invention may be the modification of polymer architecture and monomer content such that the polymer crystallization temperature is more responsive to pressure variations in order to enhance the effects of flow induced crystallization in polymer manufacturing technologies.

SUMMARY OF THE INVENTION

The present invention relates to a method enabling either the selection, the modification of existing and/or the creation of newly developed polymer materials which may provide an improved response to the application of a local shear and/or extensional deformation inside the polymer melt in different manufacturing technologies such as and without being exclusive injection molding (IM), injection stretch blow molding (ISBM), direct injection (DI), extrusion blow molding (EBM), sheet extrusion, thermoforming, etc.

The use of the present invention may generate inside the polymer melt either the single or combined presence of different types of morphological structures, such as macro-molecular alignment, macro-molecular orientation, precursors, nuclei, spherulites or various forms of crystal structures.

As a first embodiment, a method for manufacturing a polymer article is provided comprising injecting or extruding a molten polypropylene based polymer for converting it into a (semi)final shape while applying a shear rate at wall of at least 500 1/s for extruding and at least 750 1/s for injecting, wherein the polypropylene based polymer has a MFR between at least 0.3 and 100 g/10 min and having an x-value between 5 and 25 (rad/s)*(10 min/g), x being equal to $\omega_1$ divided by MFR at a temperature of 240° C.

As a second embodiment, a method for manufacturing a polymer article is provided comprising injecting or extruding a molten polyethylene based polymer for converting it into a (semi)final shape while applying a shear rate at wall of at least 500 1/s for extruding and at least 1500 1/s for injecting, wherein the polyethylene based polymer has a MFR between at least 0.08 and 25 g/10 min and having an y-value between 5 and 115 (rad/s)*(10 min/g), y being equal to $\omega_1$ divided by MFR at a temperature of 190° C.

As a third embodiment, a method for manufacturing a polymer article is provided comprising injecting or extruding molten polyester based polymer for converting it into a (semi)final shape while applying a shear rate at wall of at least 500 1/s for extruding and at least 1500 1/s for injecting, wherein the polyester based polymer has a MW between 35.000 and 143.000 g/mol, and having a z-value between 1.00E+07 and 2.70E+08 (g·rad)/(mol·s), wherein z being equal to MW multiplied with $\omega_1$ when measured at a temperature of 275° C.

As a specific embodiment directed to polyester based polymer materials, a method for manufacturing a polymer article is provided comprising injecting a molten polyester based polymer in a preform mold for converting it into a preform, and applying on the molten polyester based polymer a shear rate at the wall of 1500 1/s, wherein the polyester based polymer has a MW between 35.000 and 143.000 g/mol, and having a z-value between 1.00E+07 and 2.70E+08 (g·rad)/(mol·s), wherein z being equal to MW multiplied with $\omega_1$ when measured at a temperature of 275° C., and wherein the method further comprises biaxially stretching the preform by blowing thereby forming a container.

As another specific embodiment directed to polyester based polymer materials, a method for manufacturing a polymer article is provided comprising extruding (extrusion blow molding or sheet extrusion) a molten polyester based polymer for converting it in polymer article like for example a sheet or film, and applying on the molten polyester based polymer a shear rate at the wall of at least 500 1/s, wherein the polyester based polymer has a MW between 35.000 and 143.000 g/mol, and having a z-value between 1.00E+07 and 2.70E+08 (g·rad)/(mol·s), wherein z being equal to MW multiplied with $\omega_1$ when measured at a temperature of 275° C.

In another embodiment, a method for manufacturing a polymer article is provided comprising injecting or extruding a molten polypropylene based polymer for converting it into a (semi)final shape, the polymer having an applied Weissenberg number of at least 0.125 for extruding and at least 0.187 for injecting and a Deborah number of at least 0.25 for extruding and at least 0.375 for injecting, wherein the polypropylene based polymer has a MFR between at least 0.3 and 100 g/10 min.

In another embodiment, a method for manufacturing a polymer article is provided comprising injecting or extruding a molten polyethylene based polymer for converting it into a (semi)final shape, the polymer having an applied Weissenberg number of at least 0.125 for extruding and at least 0.375 for injecting and a Deborah number of at least 0.25 for extruding and at least 0.75 for injecting, wherein the polyethylene based polymer has a MFR between at least 0.08 and 25 g/10 min.

In another embodiment, a method for manufacturing a polymer article is provided comprising injecting or extruding a molten polyester based polymer for converting it into a (semi)final shape, the polymer having an applied Weissenberg number of at least 0.125 for extruding and at least 0.375 for injecting and a Deborah number of at least 0.25 for extruding and at least 0.75 for injecting, wherein the polyester based polymer has a MW between 35000 and 143000 g/mol.

In addition to the above embodiments, it has now been recognized that the local pressure to which the polymer melt is exposed in the flow path influences the shear level and/or extensional deformation level required for effectively generating inside the polymer melt either the single or combined presence of different types of morphological structures. Therefore, the flow path of the polymer melt may be modified as a function of shear and/or extensional deformation loss in the flow path and/or may be modified as a function of local pressure loss due to shear thinning in the flow path.

Preferably, the flow path of the polymer melt may be modified as a function of local pressure profile over at least part of the flow path, said local pressure profile being determined as a function of optimized response of the polymer melt to the applied local shear and/or extensional deformation over at least said part of the flow path.

In addition, the flow path of the polymer melt may be modified as a function of local pressure profile over at least part of the flow path, said local pressure profile being determined as a function of required critical shear over at least said part of the flow path.

In a specific embodiment, the polymer material used may result from blending or compounding a plurality of polymer materials with different MW or MFR in order to obtain a lower ω1 without substantially increasing either the MW or decreasing MFR of the obtained blend or compound.

In addition, a method for manufacturing a polymer article is provided comprising injecting or extruding a molten polypropylene, polyethylene or polyester based polymer for converting it into a (semi)final shape while applying a shear and/or extensional deformation on the polymer melt, wherein applying shear and/or extensional deformation on the polymer melt comprises selectively modifying the flow path of the molten semi-crystallizable polymer as a function of local pressure profile over at least part of the flow path, said local pressure profile being determined as a function of optimized response of the polymer melt to the applied local shear and/or extensional deformation over at least said part of the flow path. Preferably, said local pressure profile may additionally be determined as a function of required critical shear over at least said part of the flow path.

In a particular embodiment in accordance with the present invention, the flow path of the polymer melt is modified as a function of local pressure profile over at least part of the flow path, and the polymer melt is converted at a given processing temperature, wherein said processing temperature is higher than the crystallization temperature of the polymer resin at ambient pressure as determined from the corresponding PVT graph of the resin, and wherein said local pressure profile applied on the polymer melt is selected to increase the crystallization temperature towards or preferably to at least the given melt processing temperature.

In a general embodiment, the polymer melt is converted at a given local pressure and a given processing temperature, wherein said processing temperature is higher than the crystallization temperature of the polymer resin at ambient pressure, and wherein said local pressure applied on the polymer melt is selected to increase the crystallization temperature towards or preferably to at least the given melt processing temperature. In addition, the polymer melt may be sufficiently deformed to achieve molecular alignment such that crystallite nucleation is possible under a given set of processing temperature and pressure conditions.

Preferably, said given processing temperature may be within a range of 5 to 40° C. higher than the crystallization temperature of the polymer resin at ambient pressure as determined from the corresponding PVT graph of the resin, or within a range of 10 to 40° C., or within a range of 20 to 40° C. The crystallization temperature at ambient pressure is understood as the temperature on the PVT graph where the specific volume of the resin maximally increased vs temperature at ambient pressure.

Preferably, the applied local pressure may be selected within a range of 0 to 500 MPa, or 0 to 400 MPa, or preferably 0 to 200 MPa to increase the crystallization temperature of the polymer melt towards or preferably to at least the given melt processing temperature. Preferably the crystallization temperature of the polymer melt may be increased within a range of 0 to 5° C. above the melt processing temperature, or within a range of 0 to 3° C. above the melt processing temperature.

A method according to any of the above mentioned embodiments may be used in manufacturing of:
Containers for diverse food and non-food applications
any form of injected polymer articles for use in packaging, building & construction, automotive, electric & electronic applications
any form of extruded polymer articles including films.

DESCRIPTION

As first embodiment of the present invention directed to polypropylene based polymers a method for manufacturing a polymer article is provided comprising injecting or extruding a molten polypropylene based polymer for converting it into a (semi)final shape while applying a shear rate at wall of at least 500 1/s for extruding and at least 750 1/s for injecting, or for either extruding or injecting at least 800, or at least 1000, or at least 2000, or at least 4000, or at least 6000, or at least 10.000, or at least 20.000, or at least 50.000 or at least 75.000, and below 100.000 1/s, preferably between 800 and 70.000 1/s, wherein the polypropylene based polymer has a MFR between at least 0.3 and 100 g/10 min, or between 0.3 and 40, or between 1 and 80, preferably between 1 and 30 g/10 min, and having an x-value between 5 and 25 (rad/s)*(10 min/g), preferably between 10 and 23 (rad/s)*(10 min/g), x being equal to ω1 divided by MFR at a temperature of 240° C.

As second embodiment of the present invention directed to polyethylene based polymers a method for manufacturing a polymer article is provided comprising injecting or extruding molten polyethylene based polymer for converting it into a (semi)final shape while applying a shear rate at wall of at least 500 1/s for extruding and at least 1500 1/s for injecting, or for either extruding or injecting at least 2000, or at least 4000, or at least 6000, or at least 10.000, or at least 20.000, and below 50.000 1/s, preferably between 1000 and 30.000 1/s wherein the polyethylene based polymer has a MFR between at least 0.08 and 25 g/10 min, or between 0.1 and 20, preferably between 0.1 and 10 g/10 min, and having an y-value between 5 and 115 (rad/s)*(10 min/g), preferably between 10 and 110 (rad/s)*(10 min/g), y being equal to ω1 divided by MFR at a temperature of 190° C.

In an embodiment of the present invention directed to polyester based polymers, a method for manufacturing a polymer article is provided comprising injecting or extruding molten polyester based polymer for converting it into a (semi)final shape while applying a shear rate at wall of at least 500 1/s for extruding and at least 1500 1/s for injecting, or for either extruding or injecting at least 2.000 or at least 5.000, or at least 10.000, or at least 25.000 or at least 50.000 or at least 75.000, or at least 100.000, and below 160.000 1/s, and preferably between 1800 and 100.000 1/s, wherein the polyester based polymer has a MW between 35.000 and 143.000 g/mol, or between 46.000 and 116.000, or between 46.000 and 68.000 g/mol and having a z-value between 1.00E+07 and 2.70E+08 (g·rad)/(mol·s), preferably between 3E+07 and 21E+07 (g·rad)/(mol·s), wherein z being equal to MW multiplied with ω1 when measured at a temperature of 275° C.

In a specific embodiment in accordance with the present invention, a method for manufacturing a polymer article is provided comprising injecting a molten polyester based polymer in a preform mold for converting it in preform, and applying on the molten polyester based polymer a shear rate at wall of 1500 1/s, or at least 2.000 or at least 5.000, or at least 10.000, or at least 25.000 or at least 50.000 or at least 75.000, or at least 100.000, and below 160.000 1/s, and preferably between 2.000 and 50.000 1/s, wherein the polyester based polymer has a MW between 35.000 and 143.000 g/mol, preferably between 46.000 and 68.000 g/mol and having a z-value between 1.00E+07 and 2.70E+08 (g·rad)/(mol·s), preferably between 3E+07 and 21E+07 (g·rad)/(mol·s), wherein z being equal to MW multiplied with ω1 when measured at a temperature of 275° C. This method may further comprise biaxially stretching the preform by blowing thereby forming a container.

In another specific embodiment in accordance with the present invention, a method for manufacturing a polymer article is provided comprising extruding (extrusion blow molding or sheet extrusion) a molten polyester based polymer for converting it in polymer article, like for examples sheets or film, and applying on the molten polyester based polymer a shear rate at wall of at least 500 1/s, or at least 2.000 or at least 5.000, or at least 10.000, or at least 25.000 or at least 50.000 or at least 75.000, or at least 100.000, and below 160.000 1/s, and preferably between 1800 and 100.000 1/s, wherein the polyester based polymer has a MW between 35.000 and 143.000 g/mol, preferably between 46.000 and 116.000 g/mol and having a z-value between 1.00E+07 and 2.70E+08 (g·rad)/(mol·s), preferably between 3E+07 and 21E+07 (g·rad)/(mol·s), wherein z being equal to MW multiplied with ω1 when measured at a temperature of 275° C.

Melt Flow Rate is a measure of the ease of flow of melted polymers and represents a typical index for Quality Control of thermoplastics. Originally called Melt Flow Index or Melt Index (typically for polyethylene, but applied to a variety of materials), the standard designation today is Melt Mass-Flow Rate or MFR, which is a mass flow expressed (SI units) in g/10 min. An alternative quantity is the volume flow expressed (SI units) in cm3/10 min, called Melt Volume-Flow Rate or MVR. MVR multiplied by the melt density (i.e. density of the material in the melted state) gives MFR.

Melt Flow Rate (MFR) values of the propylene and polyethylene based polymers in the above embodiments are mentioned as mass flow expressed (SI units) in g/10 min and as determined by using 2.16 kg at 230° C. for polypropylene based material and using 2.16 kg at 190° C. for polyethylene based material. See the following references:

ISO 1133:2005 "Plastics—Determination of the Melt Mass-Flow Rate (MFR) and Melt Volume-Flow Rate (MVR) of Thermoplastics"

ASTM D1238-10 "Standard Test Method for Melt Flow Rates of Thermoplastics by Extrusion Plastometer"

Molecular weight (MW) values of the polyester based polymer in the above embodiments are Average molecular weight values as determined by Gel Permeation Chromatography (GPC) analysis under the following conditions:

EXPERIMENTAL

Columns: PSS PFG Linear M
Solvent: HFIP
Temperature: 30° C.
Flow Rate: 1.0 ml/min
Injection Volume: 25 μl
Detector: M-150-C
Data Module: GPC PRO 3.13

ω1 (rad/s)) values are to be determined by measuring the frequency response of the polymer at a given temperature by dynamic mechanical analysis in simple shear using a commercial rotational rheometer. The rotational rheometer should be equipped with a means of environmental temperature control such as an oven chamber. Dynamic mechanical testing involves the application of a controlled oscillatory shear strain to a material and measurement of the resultant stress as a function of the frequency of the applied shear. The phase shift in the stress response and the ratio of stress amplitude and strain amplitude allow the calculation of the dynamic moduli, the storage modulus (G'(ω)) and loss modulus (G"(ω)) as well as the complex viscosity as a function of frequency. For a given temperature, the cross-over point between G'(ω) and G"(ω) determines the ω1 value, which is understood without being bound by any theory as the point at which the storage modulus begins to surpass the loss modulus, meaning that the viscoelastic polymer behaves more as a 'solid' than as a 'liquid'. In cases where this cross-over point falls outside of the measurement range provided by the measurement equipment used, the corresponding value of the cross-over point should be determined through application of (non-) linear extrapolation of the data points obtained within the measurement range. This will be especially, but non-exclusively, valid for the cross-over point of polymer resin materials. The appropriate frequency sweep measurement protocol for polymer melts is included in annex A.

This annex also serves as a basis for measuring ω1 of polypropylene or polyethylene bases polymers.

In the simple case of a melt flow path (i.e. a channel) with circular cross-section and Newtonian materials (i.e. having constant viscosity), the shear rate at the wall (1/s) follows from the volume rate and the channel radius, as per the following equation:

$$\dot{\gamma}_w = \frac{4Q}{\pi R^3}$$

With:

Q=volume rate

R=radius of channel

For either non-Newtonian materials (eg with shear thinning) and/or for non-circular channels, shear rate at the wall is derived from the velocity distribution inside the channel which is determined by using numerical modeling, solving partial differential equations. Shear rate at wall values as mentioned in this text are determined using the so-called Carreau-model, wherein a Carreau fluid is a type of generalized Newtonian fluid where viscosity, $\mu_{eff}$, depends upon the shear rate, $\dot{\gamma}$, by the following equation:

$$\mu_{eff}(\dot{\gamma}) = \mu_{inf} + (\mu_0 - \mu_{inf})(1 + (\lambda\dot{\gamma})^2)^{\frac{n-1}{2}}$$

Where: $\mu_0$, $\mu_{inf}$, $\lambda$ and n are material coefficients.

$\mu_0$=viscosity at zero shear rate (Pa·s)

$\mu_{inf}$=viscosity at infinite shear rate (Pa·s)

$\lambda$=relaxation time (s)

n=power index

Knowing the flow path (i.e. the channel) geometry and the polymer melt volume rate through the flow path, and knowing the above mentioned four material coefficients, the shear rate at wall can be derived.

Applying shear may be performed by modifying the flow path of the molten polymer from a cross-sectional point-of-view and in relation to its length in a manner to subject the polymer melt to the required shear exposure which may generate a required morphological structure or a mixture of various morphological structures inside the polymer melt. The flow path is understood as the whole route the molten polymer has to follow from where it enters the injection molding or extrusion equipment in molten form up to the mold cavity used for the (semi-) final article, or in case of an extrusion process before, in or after the die.

Besides shear, it should be noted that modifying the flow path of a molten polymer often involves extensional flow. Extensional flow, or deformation that involves the stretching of a viscous material, is the dominant type of deformation in converging and squeezing flows that occur in typical polymer processing operations. Similar to flows in shear, extensional flows which tend to align, stretch and orient polymer chains in the melt can also generate flow induced crystallization during melt processing.

The behavior of polymer flows in uniaxial extensional deformation is typically depicted in an extensional viscosity growth curve which is a graph depicting the instantaneous (or transient) extensional viscosity as a function of time for a given temperature and extensional rate, typically plotted on a log-log scale. A growth curve provides a reflection of a material response to a controlled deformation by graphing the evolution of a material's resistance to flow (viscosity) as a function of time at a constant rate of extension. A growth plot is comprised of multiple extensional viscosity growth curves for different rates of extension which at small strains tend to superpose onto a single base curve referred to as the Linear Viscoelastic Envelope (LVE). Extensional viscosity growth curves for resins that otherwise show little deviation from the LVE in the molten state typically show notable upturn deviations from the LVE at temperatures near the crystallization temperature as a result of flow induced crystallization (FIC). With decreasing temperature, FIC behavior is manifested by increasingly larger extensional viscosity deviations from the LVE accompanied by decreasingly lower strains at the point of deviation from the LVE. Hence, the FIC behavior of a polymer resin in uniaxial extension is typically characterized by evaluating its extensional flow behavior with respect to the LVE on a growth plot at progressively cooler testing temperatures near and just below its peak melt crystallization temperature.

Extensional flow measurements performed near the melt crystallization temperature require that the polymer resin must first become molten at a temperature 10-20° C. above the peak melt temperature before being gradually cooled to the desired test temperature. It is helpful to characterize the polymer's melt crystallization behavior as a function of temperature beforehand using a technique such as differential scanning calorimetry (DSC) or differential thermal analysis (DTA) in order to determine the appropriate melt temperature range for a given polymer resin. Extensional flow experiments are typically conducted on a dual windup drum extensional rheometer such as the Sentmanat Extensional Rheometer (SER) fixture which can be accommodated within the oven chamber of the commercial rotational rheometer on which the SER fixture is being hosted. FIC experiments require tight temperature control and accuracy and minimal temperature gradients within the sample and oven chamber during the sample cooling protocol and the stretching experiment. The appropriate measurement protocol for FIC measurements on polymer melts in uniaxial extension is included in annex B.

Therefore, since flow path modification and many polymer processing operations involve a combination of both shear and extensional flows, it is useful to characterize flow deformations in more generalized, dimensionless terms such as the Deborah and Weissenberg numbers which are often used to characterize the rheological behavior of a material.

The Deborah number (De) governs the degree to which elasticity manifests itself in response to a transient deformation whether in shear or in extension. Formally, the Deborah number is defined as the ratio of the characteristic relaxation time of the fluid to the duration of the observation probing the response of the fluid. At lower Deborah numbers, the material behaves in a more fluid-like manner, with an associated Newtonian viscous flow. At higher Deborah numbers, the material behavior enters the non-Newtonian regime, increasingly dominated by elasticity and demonstrating solid-like behavior.

The Weissenberg number (Wi) compares the viscous forces to the elastic forces of a fluid as a result of an applied deformation whether in shear or in extension. Formally, the Weissenberg number is defined as the product of the characteristic relaxation time of the fluid and the rate of the applied deformation. At low Weissenberg numbers, deformations are very small or very slow and the stress responses of a fluid to a shear or extensional deformation are directly proportional indicating linear viscoelastic behavior. At higher Weissenberg numbers, deformations are large or rapid and the stress responses of a fluid to a shear or extensional deformation are not proportional indicating non-linear viscoelastic behavior.

Together these two dimensionless numbers serve to characterize the rheological behavior of a fluid with the use of a Pipkin diagram which is a plot of the Weissenberg number versus the Deborah number for a given set of material deformation conditions. For contraction flows that are common in shaping operations the Weissenberg and Deborah numbers are often written as:

$$Wi = \lambda \dot{\gamma}'_w$$

$$De = \lambda/t'$$

where λ (=1/ω1) is the characteristic relaxation time of the polymer melt and t' (=πR³/[8Q]) is the time required for flow through the contraction over an axial distance equivalent to 4 flow channel diameters.

Determining now a selection of polypropylene based resins by responsiveness to flow deformations and characterizing the selection in Deborah and Weissenberg number, a method for manufacturing a polymer article is provided comprising injecting or extruding a molten polypropylene based polymer for converting it into a (semi)final shape with an applied Weissenberg number of at least 0.125 for extruding and at least 0.187 for injecting and a Deborah number of at least 0.25 for extruding and at least 0.375 for injecting, or for either extruding or injecting Weissenberg and Deborah numbers of respectively at least 0.2 and 0.4, or at least 0.3 and 0.6, or at least 0.4 and 0.8, or at least 0.5 and 1.0, wherein the polypropylene based polymer has a MFR between at least 0.3 and 100 g/10 min.

Similar for polyethylene based polymers, a method for manufacturing a polymer article is provided comprising injecting or extruding a molten polyethylene based polymer for converting it into a (semi)final shape with an applied Weissenberg number of at least 0.125 for extruding and at least 0.375 for injecting and a Deborah number of at least 0.25 for extruding and at least 0.75 for injecting, or for either extruding or injecting Weissenberg and Deborah numbers of respectively at least 0.2 and 0.6, or at least 0.3 and 0.9, or at least 0.4 and 1.2, or at least 0.5 and 1.5, wherein the polyethylene based polymer has a MFR between at least 0.08 and 25 g/10 min.

And similar for polyester based polymers, a method for manufacturing a polymer article is provided comprising injecting or extruding a molten polyester based polymer for converting it into a (semi)final shape with an applied Weissenberg number of at least 0.125 for extruding and at least 0.375 for injecting and a Deborah number of at least 0.25 for extruding and at least 0.75 for injecting, or for either extruding or injecting Weissenberg and Deborah numbers of respectively at least 0.4 and 0.8, or at least 0.5 and 1.0, or at least 0.6 and 1.2, or at least 0.75 and 1.5, wherein the polyester based polymer has a MW between 35000 and 143000 g/mol.

It is recognized know that in methods for manufacturing a polymer article an appropriate selection of key processing parameters enable affecting a polymer's crystallization properties: rate of deformation, processing temperature, local pressure, and molecular orientation.

Rate of deformation of a polymer melt flow in the flow path should be rapid enough to trigger a crystallization reaction enabling the material to behave more elastic than viscous during the polymer article shaping process. Therefore, the deformation rate of the polymer melt should scale with the inverse of its characteristic relaxation time—in other words, the material must be shaped at a processing rate on scale with its rate of relaxation.

Frequency sweep experiments in simple shear conditions are used to determine the crossover frequency for a polymer melt at a given temperature relevant to processing. This crossover frequency provides an indication of the deformation rate at which the polymer begins to behave more solid-like (elastic) than liquid-like (viscous)

Further, the polymer melt should be processed at a temperature near the pressure-dependent crystallization temperature of the polymer resin—in other words, the material must be processed at a temperature where crystallite nucleation is possible under a given set of processing pressure and molecular orientation conditions. The underlying physical phenomenon may be that, as a polymer chain begins to freeze its molecular mobility is restricted thereby reducing its conformational entropy state which facilitates a transformation to a crystalline state. Hence, the temperature at which a material begins to freeze is dictated by the lack of molecular mobility of the polymer chains under a given set of operating conditions.

Melt dilatometer experiments may be used to determine The melt crystallization temperature as a function of pressure is to be determined from the characteristic PVT data of a given polymer resin. Such PVT graph is typically measured using melt dilatometer experiments.

In addition, the local pressure on the polymer melt at the time of the imposed molecular orientation should be high enough to increase the crystallization temperature to near or just above the melt processing temperature in order to promote crystallite nucleation. The polymer melt should be processed at a sufficiently high pressure such that the pressure-dependent shift in the crystallization temperature of the polymer resin is near the processing temperature of the shaping operation—in other words, the material must be processed at a pressure where crystallite nucleation is possible under a given set of processing temperature and molecular orientation conditions. The underlying physical phenomenon may be that an increase in pressure causes a reduction in the free volume surrounding the polymer chains which results in a decrease in the conformational entropy state and facilitates a transformation to a crystalline state. This decrease in total entropy of fusion allows crystallization to occur at higher temperatures than would otherwise occur under quiescent conditions.

Figure 2:
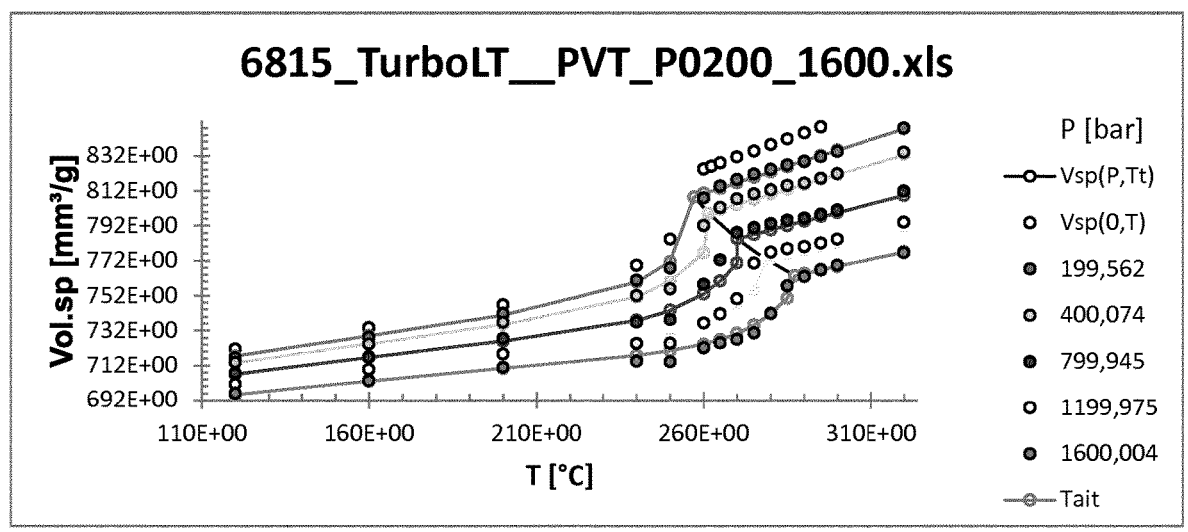

FIGS. 1 and 2 demonstrate how increasing the local applied pressure from 0 towards 1600 bars on a PET based polymer melt results in increasing the melt crystallization temperature of the polymer melt. By modifying the flow path of the polymer melt such that local pressure increases, the crystallization temperature may be increased such that it is near or just above the melt processing temperature of the exemplar polymer processing operation.

The samples were measured with Rheograph 75 twin bore 15 mm using one of the two barrels for PVT measurement. The isothermal test method was selected.

For RamaPET, the crystallization temperature was determined between 250° C. at ambient pressure and 287° C. at 1600 bars. For Turbo LT, the crystallization temperature was slightly higher at ambient pressure and 287° C. at 1600 bars.

Finally, the imposed molecular orientation should be large enough to promote molecular alignment in order to facilitate and accelerate the rate of crystallization. The polymer article shaping process should impose a sufficient degree of molecular orientation among the polymer chains in order to facilitate flow induced/enhanced crystallization—in other words, the material must be deformed in a manner to achieve a sufficient degree of molecular alignment such that crystallite nucleation is possible under a given set of processing temperature and pressure conditions. The underlying physical phenomenon may be that large shear strains and extensional flow deformations, which generate a high degree of polymer chain stretch and orientation, cause a significant distortion of polymer chains from their most probable conformation (random coil) and result in a decrease in the conformational entropy state which facilitates a transformation to a crystalline state. This decrease in total entropy of fusion allows the crystallization to occur at higher temperatures than would otherwise take place under quiescent conditions. The increased ordering and alignment of the polymer chains also results in an increased rate of crystallization compared to isotropic polymer chains.

Extensional rheology experiments may be used to determine flow induced crystallization behavior at temperatures near the melt crystallization temperature of a given polymer resin.

In addition, it has now been recognized that the local pressure at which the polymer melt is exposed to influences the shear level and/or the extensional deformation level required for effectively generating inside the polymer melt either the single or combined presence of different types of morphological structures. The local pressure inside the polymer melt may help increasing the intermolecular frictions in-between the macromolecules present inside the polymer melt, hence making the locally applied shear exposure and/or exposure to extensional deformation more effective. Since the required shear level exposure is influenced by the pressure at which the shear and/or extensional deformation is being applied, shear and or extensional deformation may preferably be applied under the most appropriate local pressure, such that the morphological nature of the polymer may change most optimally in relation to the contemplated functional performances desired in the (semi-) final polymer article.

Therefore, the flow path of the polymer melt may additionally be modified as a function of shear loss or extensional deformation gain in the flow path and/or may be modified as a function of local pressure loss due to shear thinning or local pressure increase due to extensional strain hardening in the flow path.

Preferably, the flow path of the polymer melt may be modified as a function of local pressure profile over at least part of the flow path, said local pressure profile being determined as a function of optimized response of the polymer melt to the applied local shear and/or extensional deformation over at least said part of the flow path. Optimized response of the polymer melt is understood as optimized effectiveness of the applied local shear and/or extensional deformation.

Said modification of the polymer flow path may also include any type of dimensional configuration which enables controlling the local pressure present inside the polymer melt, and at which the shear and/or extensional exposure will be performed, both from a cross-sectional point of view as well as over the length of the flow path.

In case of injection molding (direct injection or injection stretch blow molding), modifying the flow path may be achieved, amongst others, by passing the molten polymer through specially designed hot runner modifications such as profiling of the runner nozzle housing, and/or shut-off needle valve, or placing inserts within the hot runner system. (e.g. geometrical configurations such as but not limited to concentric tubes, star wheels, or other types of cross-sectional geometries and flow path diversions, or zones having diameter variations) at selected positions in the hot runner. This may be combined with high injection pressure or repetitive compression and decompression cycles. In the case of extrusion (extrusion blow molding, sheet extrusion, or blown film extrusion) the flow path of the molten polymer may be modified before or in or after the extrusion die It has surprisingly been found that polymers having a higher MW (in the case of polyester based polymers) or a lower MFR (in the case of either polypropylene/polyethylene based polymers) may demonstrate an improved response to the application of local shear and/or extensional deformation. Without being bound by any theory, it is expected that polymers having a higher MW (in the case of polyester based polymers) or a lower MFR (in the case of either polypropylene/polyethylene based polymers) demonstrating an improved response to the application of a local shear and/or extensional deformation inside the polymer melt.

Further it has also been observed that shear thinning, a rheological phenomenon wherein the viscosity of the polymer melt decreases when being subjected to local shear, comes to play a role. The reduced viscosity reduces the local pressure buildup in the polymer melt resulting from the manufacturing process. Since reduced local pressure buildup affects the effectiveness of the molecular frictions in between the polymer macromolecules, a higher shear level may be required in proportion to the selected polymer's shear thinning characteristics.

Therefore, in a further embodiment of the present invention, the flow path of the polymer melt may be modified by flow path restrictions in order to achieve a preferred pressure drop profile within the flow path taking into account the polymer melt's shear thinning behavior. For example, an insert mounted in a hot runner system may be designed such that a certain pressure drop profile along the flow path can be achieved with a prescribed reduction in channel cross section towards the mold, or by including a highly restrictive area inside the polymer melt flow path, preferably close to the mold cavity used for the (semi-) final article, or in case of an extrusion process, before, in or after the die.

In addition, since not all polymers are equally sensitive to shear thinning, in a method according to the present invention a polymer may be selected, modified or newly created not only based on MW or MFR and respective corresponding $\omega 1$ value, or on Weissenberg and Deborah numbers but in addition taking in account also the polymer's sensitivity to shear thinning.

The polyester based polymer may be based for example on PET, high IV PET or modified PET, PBT (Polybutylene terephthalate), PGA, PEN, or a combination thereof, and optionally may comprise copolymers suitable for modifying the articles' physical characteristics. The polyester based polymer may be an aromatic thermoplastic polyester, or an aliphatic thermoplastic polyester. In addition, the polyester based polymer may be a biodegradable plastic, such as for example polylactic acid (PLA), polyhydroxyalkanoates (PHA), polyethylene furanoate (PEF), polybutylene Succinate (PBS), or polyglycolic acid (PGA).

The polypropylene (PP) based polymers may be based for example on homopolymers, block copolymers, random copolymers, etc. or combinations thereof and optionally may comprise copolymers suitable for modifying the articles' physical characteristics.

The polyethylene based polymer may be based for example on low density, high or ultra-high density polyethylene and optionally may comprise copolymers suitable for modifying the articles' physical characteristics.

The polypropylene, polyethylene or polyester based material may be achieved by blending, compounding, master batching, or co-polymerization and may partially or fully be derived from natural resources.

In addition the polymers used in the present invention may comprise different types of additives, either used individually or in different forms of combinations, including but not limited to additives such as anti-oxidants, UV-absorbers, dyes, colorants, nucleating agents, fillers and mixtures thereof.

As a first benefit, methods according to the present invention now enable applying local shear and/or extension on polymer materials which are selected to demonstrate an improved response in terms of morphological changes which may occur in the polymer melt upon application of the local shear and/or extensional deformation exposure. These morphological changes may include the single and/or combined benefits of increased macro-molecular alignment, macro-molecular chain orientation, formation of precursors and/or nuclei, spherulites, and formation of various types of crystal morphologies.

Further, methods according to the present invention allow obtaining higher container volumes for a given used polymer weight compared to the state of the art. Moreover, the method of the present invention may achieve articles, in particular containers with equal of higher dimensional stability, equal or better gas and/or water barrier properties (avoiding the need for complementary barrier solutions), equal or higher impact resistance, or equal or higher thermal resistance compared to state of the art articles having the same or higher wall thickness.

Methods of the present invention may also enable manufacturing containers that suffer less shrinkage and/or less crystallization upon heat exposure, for example in hot-fill applications, as compared to the state of the art.

Upon applying an appropriate shear and/or extensional deformation at the appropriate local pressure in combination with an appropriate (semi-)crystallizable polymer as described in the above embodiments, the polymer melt molecules may (partially) align and/or orientate itself and/or exhibit crystallization such that the resulting (semi-)final article may show fractions of various morphological structures, such as the single and/or combined presence of macro-molecular alignment, macro-molecular amorphous chain orientation, formation of precursors and/or nuclei, spherulites, formation of various types of crystal morphologies. In other words: the combination of the applied local pressure and/or applied local shear and/or extensional deformation needs to be sufficiently high to generate the various morphological fractions which are referenced, the proper selection on the most appropriate resin should ensure that the polymer reacts most optimally to the application of the local shear and/or extensional deformation exposure.

In accordance with the principle of Flow Induced Crystallization, progressively higher stresses are expected to lead to the progressive creation of diverse types of morphologic structures inside the polymer melt, such as—without being limitative—macro-molecular alignment, macro-molecular chain orientation, precursors, nuclei, spherulites, and various forms of crystal structures.

Polymer chains can be aligned or oriented. Depending on the temperature and the degree of deformation and/or external force the degree of orientation can vary and could lead to crystallization. However, orientation does not imply crystallinity. Polymers can be amorphous and yet oriented.

Crystallization of polymers is a process associated with partial alignment of their molecular chains. The formation of precursors or nuclei is the first step in the formation of either a new thermodynamic phase or a new structure via self-assembly or self-organization. Nucleation starts with small, nanometer-sized areas where as a result of heat motion some chains or their segments occur parallel. Those seeds can either dissociate, if thermal motion destroys the molecular order, or grow further, if the grain size exceeds a certain critical value.

The growth of the crystalline regions preferably occurs in the direction of the largest temperature gradient and is suppressed at the top and bottom of the lamellae by the amorphous folded parts at those surfaces. In the case of a strong gradient, the growth has a unidirectional, dendritic character. However, if temperature distribution is isotropic and static then lamellae grow radially and form larger quasi-spherical aggregates called spherulites. Spherulites have a size between about 1 and 100 micrometers and form a large variety of colored patterns when observed between crossed polarizers in an optical microscope, which often include the "maltese cross" pattern and other polarization phenomena caused by molecular alignment within the individual lamellae of a spherulite.

The key parameter for Flow Induced Crystallization is linked with the so-called natural critical shear level, above which a full stretch of the polymer backbone is being achieved at atmospheric pressure and at a given reference temperature. Through combination of scientific literature, a generic formula for this Critical shear has now been derived: $Cs=3*Mw*\omega1/Me$ with Mw:the weight average molecular weight of the polymer; $\omega1$:the cross-over point between storage modulus $G'(\omega)$ and loss modulus $G''(\omega)'$ and Me:the entangled molecular weight.

It is further observed that upon applying shear levels of different intensity, articles with different morphological structure may be generated. As an example it is observed that exposing the polymer melt to a shear level (substantially) above the critical shear level, the resulting article may obtain a morphological structure which may also comprise a fraction of spherulites, being quasi-spherical semi-crystalline aggregates within the (oriented) amorphous polymer matrix, and/or a fraction of rod-like crystalline structures, and/or a fraction of shish-kebab crystalline structures.

In an additional embodiment, the present invention proposes methods attempting to decrease the Critical shear in order to more easily reach shear levels where the various morphologic structures are being created inside polymer melt through either the selection of the most appropriate polymer, the modification of existing or the creation of newly designed polymers.

As explained above, since a newly derived generic formula for critical shear is $Cs=3*MW*\omega1/ME$, and taking in account that $\omega1$ decreases with increasing molecular weight, selecting a polypropylene based, polyethylene based, or polyester based polymer material having an appropriate window for respective MFR or MW and respective x-, or y-, or z-value, optionally taking in account also the polymer's sensitivity to shear thinning as well as the local pressure the polymer melt is exposed to in the flow path, may result in a manufacturing method wherein the selected polymer is exposed to an appropriate shear level below or above the Critical shear in order to induce the single or combined fractions of macro-molecular alignment, macro-molecular chain orientation, precursors and/or nuclei, spherulites and formation of various types of crystal morphologies.

In addition, the flow path of the polymer melt may be modified as a function of local pressure profile over at least part of the flow path, said local pressure profile being determined as a function of required critical shear over at least said part of the flow path. Preferably, the local pressure profile is determined as a function of critical shear obtainable within the operational boundaries of the polymer manufacturing technology.

In case of injection stretch blow molding, the shear level should be chosen such that the manufactured preform obtains a morphological structure which provides an optimal balance in-between the various morphological fractions induced by the application of the local shear and the ability to stretch blow mold the preform into its final bottle shape.

Table 1, 2, and 3 illustrate the critical shear as a function of applied local pressure in the polymer melt flow path for respectively a number of PE, PP and PET resins. For example, if a Turbo LT melt is exposed to a local pressure in the flow path of 1000 bar, applying a shear rate at wall of at least 3512 1/s may expose the polymer melt above its critical shear and may induce combined fractions of macro-molecular alignment, macro-molecular chain orientation, precursors and/or nuclei, up to spherulites and formation of various types of crystal morphologies.

particular, for polyester based materials, it is expected that spiking a high Mw fraction into a lower Mw polymer would significantly decrease $\omega 1$ without significantly increasing MW of the obtained blend. For polypropylene and polyethylene polymers, the spiking of a lower MFR fraction into a higher MFR polymer would lead to similar decrease of the

TABLE 1

| Type | Resin | Supplier | Mw (gr/mol) | Me (gr/mol) | $\omega 1$ (rad/s) @ 190 C. | Cs (1/s) @ atm. Press. | Evolution of Cs in function of local pressure | | | | |
|---|---|---|---|---|---|---|---|---|---|---|---|
| | | | | | | | 200 (bar) | 400 (bar) | 600 (bar) | 800 (bar) | 1000 (bar) |
| PE | MB6561 | Borealis | 112800 | 1000 | 78 | 26395 | 21611 | 17693 | 14486 | 11860 | 9710 |
| PE | BB2581 | Borealis | 159800 | 1000 | 12 | 5897 | 4828 | 3953 | 3236 | 2650 | 2169 |

TABLE 2

| Type | Resin | Supplier | Mw (gr/mol) | Me (gr/mol) | $\omega 1$ (rad/s) @ 240 C. | Cs (1/s) @ atm. Press. | Evolution of Cs in function of local pressure | | | | |
|---|---|---|---|---|---|---|---|---|---|---|---|
| | | | | | | | 200 (bar) | 400 (bar) | 600 (bar) | 800 (bar) | 1000 (bar) |
| PP | BH374MO | Borealis | 170200 | 4000 | 753 | 96120 | 61905 | 39869 | 25677 | 16537 | 10650 |
| PP | RB206MO | Borealis | 322200 | 4000 | 31 | 7588 | 4887 | 3147 | 2027 | 1305 | 841 |

TABLE 3

| Type | Resin | Supplier | Mw (gr/mol) | Me (gr/mol) | $\omega 1$ (rad/s) @ 275 C. | Cs (1/s) @ atm. Press. | Evolution of Cs in function of local pressure | | | | |
|---|---|---|---|---|---|---|---|---|---|---|---|
| | | | | | | | 200 [bar] | 400 [bar] | 600 [bar] | 800 [bar] | 1000 [bar] |
| PET | Ramapet L1 | Indorama | 37192 | 1060 | 3663 | 385568 | 156760 | 63734 | 25912 | 10535 | 4283 |
| PET | Turbo LT | M&G | 50500 | 1060 | 2212 | 316149 | 128537 | 52259 | 21247 | 8638 | 3512 |
| PET | Relpet H7761 | Reliance | 51650 | 1060 | 1744 | 254067 | 103649 | 42141 | 17133 | 6966 | 2832 |
| PET | Ramapet R1 | Indorama | 57800 | 1060 | 1176 | 192392 | 78221 | 31802 | 12930 | 5257 | 2137 |
| PET | Flessenpet 1.30 | Dufor | 115947 | 1060 | 536 | 175791 | 71471 | 29058 | 11814 | 4803 | 1953 |

Determination of the presence and types of morphological fractions, such as oriented amorphous or (semi-)crystalline structures may be performed by any suitable method known in the art, either in single or combined use, such as for example light scattering based methods, capillary rheology, differential scanning calorimetry, X-ray analysis (WAXS, SAXS), density analysis, birefringence analysis, etc. If required, the available analytical characterization methods need to be combined to demonstrate the presence of the various morphological structures present in the final polymer article.

In a further embodiment in accordance with the present invention, polypropylene (PP) based, polyethylene (PE) based, or polyester based polymer materials not having suitable characteristics with regards to respective MFR or MW and respective x-, or y-, or z-value, may be modified such as to obtain suitable characteristics for obtaining improved response to the application of the local shear in function of achieving the desired morphological changes in the (semi)-final polymer article.

Modifying Mw or either MFR may be done by blending polymers with different molecular weight/MFR fractions. In $\omega 1$ without substantially decreasing the MFR of the obtained blend. As such suitable bi-modal or even multi-modal polymers may be developed.

As can be derived from the above explained critical shear formula, decreasing $\omega 1$ without significantly increasing MW would significantly lower the critical shear of the polymer blend, which results in that the shear level required for obtaining a desired morphological structure in the polymer article is more easily achievable. As known in the art, blending polymer materials may be done by simply mixing the weight fractions before entering the injecting molding or extrusion equipment, by master batching, by compounding different polymers together, etc.

It is clear that, besides modifying existing polymers, new polymer materials may be designed as to fulfil the requirements with respect to MW or MFR, and $\omega 1$, shear thinning sensitivity, etc. for obtaining an improved response in relation to the morphological changes which may occur in the polymer melt upon application of the local shear exposure, including the single and/or combined benefits of increased macro-molecular alignment, polymer chain orientation, formation of precursors and/or nuclei, spherulites and formation of various types of crystal morphologies.

It has also been surprisingly found that exposure of the polymer melt to shear levels above and substantially above the Critical shear level may lead to a more dominant presence of morphological fractions characterized as precursors, nuclei, spherulites or crystal like. In case of for example direct injection, a resulting final article may be obtained having high thermal stability, barrier performance and mechanical rigidity. However, in an extreme case, a resulting polymer semi-final article may reach an excessive presence of said morphologic fractions such that finalizing steps, such as blow molding in the case of preforms may either be substantially impeded, or may even not be feasible anymore under conventional operational manufacturing conditions.

Polymer articles as manufactured in accordance with the present invention may have comparable or better thermal stability, barrier performance and mechanical rigidity as compared to a state of the art article of the same type.

For example, in case of a 500 ml carbonated soft drink (CSD) type bottle, the specs of a bottle as manufactured by injection stretch blow molding from PET as selected in accordance with the present invention may be the following:

weight 24 or less, consequently having a weight/volume ratio of 0.0480 g/ml or less, while meeting the following characteristics:
top load: +/−20 kg or higher (cfr ISBT procedures: International Society of Beverage Technologists)
burst pressure: +/−10 bar or higher
$CO_2$: 17.5% or less loss over 10 weeks at ambient (22° C.) temperature
2.5% or less thermal expansion cfr ISBT thermal stability test Idem in case of a 1500 ml carbonated soft drink (CSD) type bottle, made from PET:

weight 40 g or less, consequently having a weight/volume ratio of 0.0267 g/ml or less, while meeting the following characteristics:
top load: +/−20 kg or higher (cfr ISBT procedures: International Society of Beverage Technologists)
burst pressure: +/−10 bar or higher
$CO_2$: 17.5% or less loss over 12 weeks at ambient (22° C.) temperature
2.5% or less thermal expansion cfr ISBT thermal stability test Another example of an application of a method in accordance with the present invention relates to HDPE containers made by Extrusion Blow molding, whereby the absence of high stretching upon blow molding leads to a low degree of molecular orientation inside the container. Imparting a higher degree of orientation inside the preform and subsequently the blown bottle might lead to further functional performance improvements.

Another example relates to thermoformed polymer trays whereby the absence of high degree of stretching requires the use of separate barrier films for improved permeation performance. Imparting an improved morphologic structure in the extruded polymer sheet which will be used for subsequently manufacturing the thermoformed tray could lead to improved barrier characteristics.

Another example relates to the use of PET containers for carbonated beverage products in geographies with more stringent environmental conditions. The commercial shelf life of such products is typically limited by the loss of the carbon dioxide ($CO_2$), which leads to consumers rejecting the product due to its 'flat' taste. The conventional solution would involve the use of performance engineered polymers in combination with other manufacturing techniques improving the barrier performance, like the application of diverse types of internal and/or external coatings. It is however clear that such solutions come at both high ecologic and economic costs, hence are no longer preferred in view of the sustainability challenges being faced. A more optimal solution would involve introducing controlled changes to the PET morphologic structure which are beneficial to an increased barrier performance, herewith reducing or even eliminating the need for the conventional technical solutions.

As mentioned earlier, a benefit of the present invention is also that it reduces design constraints with regards to the neck opening in the manufacturing of high volume containers in injection stretch blow molding. Since each polymer has a maximum stretch ratio which has to be respected in view of potential issues with overstretching and the formation of microfaults inside the final obtained container, there is a limitation with regards to the maximum container size which can be achieved for a given neck opening diameter. The present invention may enable changing the morphologic structure of the polymer article such that the achievable stretch ratios upon blow molding could be modified and that the currently faced limitations could be reduced.

It should be clear that the above mentioned examples are provided by way of illustration and are in no way meant to be limitative as to the benefits potentially resulting from achieving an improved morphological structure inside a (semi-) final polymer article.

Table 4, 5, and 6 below illustrate specific embodiments in accordance with the present invention with regards to appropriate shear levels, MFR, MW and x,y,z-values for respectively PP, PE, and polyester-based polymer materials and different polymer article manufacturing methods. This table also mentions examples of commercially available polymer resins as selected for being used in polymer article manufacturing methods according to the present invention.

TABLE 4

| | | | | Method | | ISBM | DI | EBM | SHEET EXTRUSION |
|---|---|---|---|---|---|---|---|---|---|
| PP | Melt Flow Rate | Min | MFR | ISO1133/ASTM D1238 230°; 2.16 kg | g/10 min | 0.3 | 0.3 | 0.3 | 0.3 |
| | | Max | MFR | ISO1133/ASTM D1238 230°; 2.16 kg | g/10 min | 40 | 100 | 40 | 40 |
| | | Optimal | MFR | ISO1133/ASTM D1238 230°; 2.16 kg | g/10 min | 1-30 | 2-80 | 1-30 | 1-30 |
| | x-value | Min | x = | Determination | (rad/s) * | 5 | 5 | 5 | 5 |
| | | Max | w1/ | of G' and G" + | (10 min/g) | 25 | 25 | 25 | 25 |

TABLE 4-continued

|  |  |  | Method |  |  | ISBM | DI | EBM | SHEET EXTRUSION |
|---|---|---|---|---|---|---|---|---|---|
|  | Optimal | MFR | extrapolation if needed | @ 240° |  | 10-23 | 10-23 | 10-23 | 10-23 |
| shear | Min | Shear | Carreau model | s-1 |  | 750 | 750 | 500 | 750 |
|  | Max | rate |  |  |  | 100.000 | 100.000 | 100.000 | 100.000 |
|  | Optimal | at wall |  |  |  | 800-70000 | 800-70000 | 800-70000 | 800-70000 |
| Location |  |  |  |  |  | hot runner cavity | hot runner cavity | before or in extrusion die | before or in extrusion die |
| Geometries |  |  |  |  |  | all types | all types | all types | all types |
| Injection | Min | cm3/s |  |  |  | 3 | 3 |  |  |
| speed | Max |  |  |  |  | 50 | 90 |  |  |
|  | Optimal |  |  |  |  | 10-30 | 10-80 |  |  |
| Injection | Min | bar |  |  |  | 200 | 200 |  |  |
| pressure | Max |  |  |  |  | 3.000 | 5.000 |  |  |
|  | Optimal |  |  |  |  | 400-2.500 | 400-4.000 |  |  |
| Resin Examples |  |  |  |  |  | Borealis RF365MO | Borealis BH374MO | Borealis RB206MO | Borealis RF365MO |

TABLE 5

|  |  |  |  | Method |  | ISBM | DI | EBM | SHEET EXTRUSION |
|---|---|---|---|---|---|---|---|---|---|
| PE | Melt Flow Rate | Min | MFR | ISO1133/ASTM D1238 190°; 2.16 kg | g/10 min | 0.08 | 0.08 | 0.08 | 0.08 |
|  |  | Max | MFR | ISO1133/ASTM D1238 190°; 2.16 kg | g/10 min | 25 | 25 | 25 | 25 |
|  |  | Optimal | MFR | ISO1133/ASTM D1238 190°; 2.16 kg | g/10 min | 0.1-10 | 0.1-20 | 0.1-10 | 0.1-10 |
|  | y-value | Min | y-w1/ MFR | Determination of G' and G'' + extrapolation if needed | (rad/s) * (10 min/g) @ 190° | 5 | 5 | 5 | 5 |
|  |  | Max |  |  |  | 115 | 115 | 115 | 115 |
|  |  | Optimal |  |  |  | 10-110 | 10-110 | 10-110 | 10-110 |
|  | shear | Min | Shear | Carreau model | s-1 | 1.500 | 1.500 | 500 | 1.000 |
|  |  | Max | rate |  |  | 50.000 | 50.000 | 50.000 | 50.000 |
|  |  | Optimal | at wall |  |  | 1800-30000 | 1800-30000 | 1000-30000 | 1800-30000 |
| Location |  |  |  |  |  | hot runner cavity | hot runner cavity | before or in extrusion die | before or in extrusion die |
| Geometries |  |  |  |  |  | all types | all types | all types | all types |
| Injection | Min | cm3/s |  |  |  | 3 | 3 |  |  |
| speed | Max |  |  |  |  | 50 | 90 |  |  |
|  | Optimal |  |  |  |  | 10-30 | 10-80 |  |  |
| Injection | Min | bar |  |  |  | 200 | 200 |  |  |
| pressure | Max |  |  |  |  | 3.000 | 5.000 |  |  |
|  | Optimal |  |  |  |  | 400-2.500 | 400-4.000 |  |  |
| Resin Examples |  |  |  |  |  | Borealis MB6561 | Borealis MB6561 | Borealis BB2581 | Borealis Borstar FB1370 |

TABLE 6

|  |  |  |  | Method |  | ISBM | DI | EBM | SHEET EXTRUSION |
|---|---|---|---|---|---|---|---|---|---|
| PET | Intrinsic Viscosity/ Molecular weight | Min | IV | ASTM D4603 | dl/g | 0.62 | 0.58 | 0.8 | 0.58 |
|  |  |  | Mw | GPC | gr/mol | 40.000 | 35.000 | 56.700 | 35.000 |
|  |  | Max | IV | ASTM D4603 | dl/g | 1.33 | 1.5 | 1.5 | 1.5 |
|  |  |  | Mw | GPC | gr/mol | 120.000 | 143.000 | 143.000 | 143.000 |

TABLE 6-continued

| | | | Method | | ISBM | DI | EBM | SHEET EXTRUSION |
|---|---|---|---|---|---|---|---|---|
| | Optimal | IV | ASTM D4603 | dl/g | 0.7-0.9 | 0.7-0.9 | 0.9-1.3 | 0.7-1.3 |
| | | Mw | GPC | gr/mol | 46.000-68.000 | 46.000-68.000 | 68.000-116.000 | 46.000-116.000 |
| z-value | Min | z = | Determination | (g * rad)/ | 1.00E+07 | 1.00E+07 | 1.00E+07 | 1.00E+07 |
| | Max | Mw · | of G' and G" + | (mol * s) | 2.70E+08 | 2.70E+08 | 2.70E+08 | 2.70E+08 |
| | Optimal | w1 | extrapolation if needed | @ 275° | 3E+07-21E+07 | 3E+07-21E+07 | 3E+07-21E+07 | 3E+07-21E+07 |
| shear | Min | Shear rate at wall | Carreau model | s-1 | 1.500 | 1.500 | 500 | 1.000 |
| | Max | | | | 160.000 | 160.000 | 160.000 | 160.000 |
| | Optimal | | | | 1800-100000 | 1800-100000 | 1800-100000 | 1800 100000 |
| Location | | | | | hot runner cavity | hot runner cavity | before or in extrusion die | before or in extrusion die |
| Geometries | | | | | all types | all types | all types | all types |
| Injection speed | Min | cm3/s | | | 3 | 3 | | |
| | Max | | | | 50 | 90 | | |
| | Optimal | | | | 10-30 | 10-60 | | |
| Injection pressure | Min | bar | | | 200 | 200 | | |
| | Max | | | | 3.000 | 5.000 | | |
| | Optimal | | | | 400-2.500 | 400-4.000 | | |
| Resin Examples | | | | | M&G Turbo LT Ramapet R1 Relpet H7761 | Ramapet L1 Dufor flessenpet 1.3 | Invista Polyclear EBM | M&G Cleartuf T95 |

ANNEX A: FREQUENCY SWEEP EXPERIMENTS ON POLYMER MELTS: MEASUREMENT PROTOCOL

1. Scope

This protocol can be used for semicrystalline polymers in the molten state.

2. Sample Preparation a. Drying of Hygroscopic Polymer Resin:

Polymer resins that are hygroscopic in nature must first be dried before being melted in order to avoid excessive bubble and void formation during the melting process. Such polymer samples are to be dried in a vacuum oven for at least 20 hours at a temperature of 140° C. and at a pressure of less than 25 mBar. After being removed from the vacuum oven, the resin samples are to be placed and stored in a desiccator.

b. Flat Sample Film:

Flat polymer films are produced via film extrusion or compression moulding. Extruded films are to be annealed for a period of 12 hours in an oven at a temperature 5-20° C. below the peak melt temperature of the resin. Compression moulded films are to be pressed in a hydraulic press at a temperature 10-30° C. above the peak melt temperature of the polymer resin for a period of 5-10 minutes at a compressive load of 20000 lbs. Sample films are to be moulded in a sandwich-type flat mould between high-temperature mould release films of PTFE or similar material. A typical mould cavity is 2 mm thick and 4 cm in diameter. After loading the mold with sample resin, the sandwiched mold is put between the heated platens of the hydraulic press for about one minute before pressure is applied to the mold in order allow the polymer resin to melt and become soft. Platen pressure is then gradually increased to a load of at least 10,000 lbs. After 10 minutes the press is opened and the sandwiched mold is removed and allowed to cool to room temperature.

c. Specimen Cutting:

Samples of 25 mm diameter are cut from the flat sample films using a circular die cutter. Make sure that a sample does not contain any impurities or air bubbles.

3. Using Parallel Platen Geometry for Frequency Sweeps on the Rotational Rheometer The user must be trained and familiar with the safety and operational procedures of the rotational rheometer. Shear frequency sweeps experiments are to be performed with parallel plate fixtures or alternatively with cone-and-plate fixtures. The following test protocol describes operation with 25 mm diameter parallel plate fixtures used on a commercial rotational rheometer configured with an oven chamber. The user must wear proper hand and skin protection to prevent personal injury with the hot surfaces of the fixtures and the oven chamber.

Test Set-Up:

Open the oven chamber and carefully install the upper and lower 25 mm diameter parallel plate test geometries on the rotational rheometer. Inspect the plate surfaces and ensure that they are clean and free of dust and other such residual contamination.

In the rheometer control software, ensure that the instrument motor and test protocol is operating in a dynamic oscillatory mode of operation and that the 25 mm diameter parallel plate test geometry has been selected in the test geometry options.

In the rheometer control software, select the test protocol that allows for a strain-controlled, dynamic frequency sweep. Edit the parameters of the test protocol by entering the desired range of frequencies (e.g. 0.1 to 200 rad/s), strain amplitude (e.g. 10% or less) and number of data points to be collected per decade of frequency (e.g. at least 5 points per decade).

Carefully lower the upper plate so that there is approximately a 1 mm gap between the upper and lower plates.

Close the oven chamber and in the rheometer control software set the desired test temperature for the polymer melt (e.g. for polyester resin melts test temperatures of 265° C., 275° C. and 285° C. are commonly used). If the molten polymer resin is subject to oxidation and/or degradation during the course of testing at a desired test temperature or set of temperatures or over an extended period of time while in the molten state, an inert gas environment such as nitrogen gas should be used in the oven chamber during testing.

Allow the fixtures to equilibrate at the desired test temperature for a period of at least 10 minutes prior to proceeding with the test protocol.

Zero Gap Setting and Sample Loading:

After allowing the upper and lower plate fixtures to equilibrate at the desired test temperature, select the automatic zero gap feature in the rheometer control software in order to establish the gap reference between the upper and lower plate fixtures. After establishing the zero gap reference, if the control software is configured to do so, select the temperature compensation option for the test fixtures so that the software can automatically compensate for any thermal expansion differences in the gap reference for subsequent tests performed at different temperatures.

With the zero gap referenced, set the gap between the upper and lower plates to a distance of 3 mm.

Open the oven chamber and with a set of tweezers carefully center and place the 25 mm diameter sample disc onto the lower plate.

Close the oven chamber and allow the oven temperature to equilibrate.

Gradually set the gap to a distance of 1.025 mm being careful to avoid excessive normal forces while the polymer sample is being squeezed. If the gap setting control is automated in the rheometer control software, be sure to establish normal force limits within the prescribed scale of the transducer force range in order to avoid damage to the instrument and transducer.

Once the gap of 1.025 mm has been reached, allow the normal force to relax completely.

Once the normal force has completely relaxed, open the oven chamber and carefully trim excess material around the edges of the plates using a trimming tool. A flat, soft metal trimming tool made of brass or aluminum is recommended in order to avoid damage to the edges of the plates during the trimming procedure. After trimming, the edges of the molten sample should be flush with the edges of the upper and lower circular plates.

Upon completion of the trimming procedure, close the oven chamber and allow the oven chamber temperature to equilibrate.

Once the temperature has equilibrated and the normal force has completely relaxed, set the gap to a distance of 1.000 mm and then allow the normal force to completely relax.

Performing the Test:

Once the temperature has equilibrated and the normal force has completely relaxed, start the test using the rheometer control software.

After the frequency sweep experiment has completed at the desired test temperature. If subsequent testing on the same sample is to be performed at another test temperature, allow the normal force to completely relax before changing the test temperature. Once the normal force has completely relaxed, change the test temperature then allow the temperature to equilibrate for at least 10 minutes and the normal force to completely relax before starting the next test on the same material sample.

After the Test is Finished:

After testing has completed, open the oven.

Carefully raise the upper plate taking special care not to exceed the normal force capacity of the transducer.

Once the plates have been fully separated, carefully remove any remnant material from the plates using a brass or aluminum scraping tool and then wipe the plate surface clean with a cloth or laboratory tissue. During cleaning, be careful not to overload the rheometer transducer.

4. References

ISO 6721-10:1997(E): "Plastics—Determination of dynamic mechanical properties—Part 10: Complex shear viscosity using a parallel-plate oscillatory rheometer" Zeichner, G. R., Patel, P. D., Proc. 2nd World Congr. Chem. Eng. 6, 373 (1981).

ANNEX B: FLOW INDUCED CRYSTALLIZATION MEASUREMENTS ON POLYMER MELTS IN UNIAXIAL EXTENSION—MEASUREMENT PROTOCOL

1. Scope

This protocol can be used for semicrystalline polymers in the molten state.

2. Sample Preparation a. Drying of Hygroscopic Polymer Resin:

Polymer resins that are hygroscopic in nature must first be dried before being melted in order to avoid excessive bubble and void formation during the melting process. Such polymer samples are to be dried in a vacuum oven for at least 20 hours at a temperature of 140° C. and at a pressure of less than 25 mBar. After being removed from the vacuum oven, the resin samples are to be placed and stored in a desiccator.

b. Flat Sample Film:

Flat polymer films are produced via film extrusion or compression moulding. Extruded films are to be annealed for a period of 12 hours in an oven at a temperature 5-20° C. below the peak melt temperature of the resin. Compression moulded films are to be pressed in a hydraulic press at a temperature 10-30° C. above the peak melt temperature of the polymer resin for a period of 5-10 minutes at a compressive load of 20000 lbs. Sample films are to be moulded in a sandwich-type flat mould between high-temperature mould release films of PTFE or similar material. The mould is to be 0.5-0.8 mm in thickness with minimum cavity dimensions of 100 mm×100 mm. After loading the mold with sample resin, the sandwiched mold is put between the heated platens of the hydraulic press for approximately one minute before pressure is applied to the mold in order allow the polymer resin to melt and become soft. Platen pressure is then gradually increased to a load of at least 10,000 lbs. After 10 minutes the press is opened and the sandwiched mold is removed and allowed to gradually cool to room temperature.

c. Specimen Cutting:

Strips approximately 15-18 in width are cut from the flat sample films using laboratory shears. Specimens are then cut to width using a dual parallel blade guillotine cutter with typical specimen widths ranging from 3 to 13 mm. Make sure that a cut specimen does not contain any impurities or air bubbles.

3. Using the SER for Transient Extensional Viscosity Measurements

The SER is a detachable fixture for use on a commercial rotational rheometer equipped with an environmental oven chamber. The user must be trained and familiar with the safety and operational procedures of the host rheometer system and the SER fixture. The following steps outline how to operate the SER under steady/constant Hencky strain rate conditions with polymer melts.

Test Set-Up:
  In the rheometer control software, ensure that the instrument motor and test protocol is operating in a steady rotational rate mode of operation.
  Ensure that the SER test geometry has been selected in the test geometry options.
  Enter the desired extensional rate in the control software ensuring that the test will endure at least one complete drum revolution during the stretching experiment.
  Ensure that the data collection in the software includes the time, rate, torque and extensional viscosity data during the entire experiment.

Specimen Loading:
  Open the oven chamber and verify that the SER windup drums and securing clamps have been properly cleaned and ready to accept a new specimen. Insert the securing clamps into each of the windup drums such that they are adequately extended from the drum surfaces to facilitate sample loading and then close the oven chamber. Alternatively, the experienced user may obviate the need for securing clamps such that the polymer specimen is allowed to melt directly onto the drums during specimen loading without the securing clamps being present which greatly reduces the specimen loading time and the time that the oven chamber needs to be open.
  In the rheometer control software, set the oven to a temperature 10 to 20° C. above the peak melt temperature of the polymer resin.
  Carefully monitor the measured oven temperature until the desired temperature setting is achieved. If the unit is being operated at a new temperature or is being heated from room temperature, wait at least 15 minutes to allow the unit to "soak" once the desired operating temperature has been reached.
  Prior to specimen loading, measure and record the specimen's width and thickness dimensions. Enter the specimen dimensions in the rheometer control software so that the extensional viscosity of the specimen can be calculated.
  The user must wear proper hand and skin protection to prevent personal injury with the hot surfaces of the SER and the oven chamber. The specimen should be handled with tweezers at all times during the specimen loading process. Open the oven chamber and carefully load the specimen onto the pre-heated SER drums so that the length dimension of the specimen is horizontally oriented. The user must be adept at handling and loading the specimen with tweezers such that the specimen loading procedure should take only a matter of 10-20 seconds. Hence, very little heat will be lost by the oven and SER fixture with a well-executed loading procedure.
  Once the specimen has been properly loaded, close the oven and allow the chamber to begin reheating.
  After closing the oven, wait 20 seconds and then reduce the oven temperature setting in the instrument control software to the desired test temperature of the extensional test. Rapid cooling within the oven should be avoided in order to prevent large temperature gradients within the oven and the polymer specimen contained therein. It is preferable to allow the oven chamber temperature to gradually cool to the desired test temperature.
  The desired test temperature (±0.2° C. of the set point) must be achieved within 200 seconds after the sample was loaded onto the SER.
  The extensional test is to be started 240 seconds after the sample was loaded onto the SER.

Performing the Test:
  Closely monitor the oven temperature and verify that the desired test temperature has been reached to within ±0.2° C.
  In the control software, begin the test to initiate the specimen stretching experiment.
  If possible, during the test visually monitor the specimen through an oven viewport to verify homogeneous flow deformation or to observe any sample necking that may occur during the stretching experiment.
  Ensure that the stretching experiment continues until the specimen ruptures or until the specimen begins to overwrap the ends of the wound specimen.

After the Test is Finished:
  Upon completion of the stretching experiment, open the oven chamber and carefully remove the specimen remnants from the windup drums.
  Once the specimen remnants have been removed, carefully wipe down the windup drums with a clean cloth or laboratory tissue to remove any remaining residue off the drum surfaces.
  Upon completion of the cleaning procedure, close the oven to allow the SER to get back up to temperature for subsequent measurements.

4. References

Sentmanat, M. L., "Miniature universal testing platform: From extensional melt rheology to solid-state deformation behavior," Rheol. Acta 43, 657-669 (2004).

Sentmanat, M; Wang, B N; McKinley, G H, "Measuring the transient extensional rheology of polyethylene melts using the SER universal testing platform," J. Rheol., 49 (3), 585-606 (2005)

The invention claimed is:

1. A method for manufacturing a polymer article comprising injecting or extruding a molten polypropylene based polymer in a flow path for converting it into a semifinal shape, said polymer having an applied Weissenberg number of at least 0.125 for extruding and at least 0.187 for injecting and a Deborah number of at least 0.25 for extruding and at least 0.375 for injecting, wherein the polypropylene based polymer has a MFR between at-least 0.3 and 100 g/10 min.

2. A method according to claim 1 comprising selectively modifying the flow path of the molten semi-crystallizable polymer within the hot runner system, or within the extruder or die.

3. A method according to claim 2, wherein the flow path of the polymer melt is modified as a function of local pressure profile over at least part of the flow path, said local pressure profile being determined as a function of optimized response of the polymer melt to the applied local shear and/or extensional deformation over at least said part of the flow path.

4. A method according to claim 3, wherein the flow path of the polymer melt is modified as a function of local pressure profile over at least part of the flow path, said local pressure profile being determined as a function of required critical shear over at least said part of the flow path.

5. A method according to claim 3 wherein the polymer material results from blending or compounding a plurality of polymer materials with different MW or MFR in order to obtain a lower crossover frequency ω1 without substantially increasing either the MW or decreasing MFR of the obtained blend or compound.

6. A method according to claim 2, wherein the flow path of the polymer melt is modified as a function of local pressure profile over at least part of the flow path, said local pressure profile being determined as a function of required critical shear over at least said part of the flow path.

7. A method according to claim 6 wherein the polymer material results from blending or compounding a plurality of polymer materials with different MW or MFR in order to obtain a lower crossover frequency ω1 without substantially increasing either the MW or decreasing MFR of the obtained blend or compound.

8. A method according to claim 2 wherein the polymer material results from blending or compounding a plurality of polymer materials with different MW or MFR in order to obtain a lower crossover frequency ω1 without substantially increasing either the MW or decreasing MFR of the obtained blend or compound.

9. A method according to claim 1 comprising injecting or extruding a molten polypropylene, based polymer for converting it into a semi-final shape while applying a shear and/or extensional deformation on the polymer melt, wherein applying shear and/or extension deformation on the polymer melt comprises selectively modifying the flow path of the molten semi-crystallizable polymer as a function of local pressure profile over at least part of the flow path, said local pressure profile being determined as a function of optimized response of the polymer melt to the applied local shear and/or extensional deformation over at least said part of the flow path.

10. A method according to claim 9, wherein the flow path of the polymer melt is modified as a function of local pressure profile over at least part of the flow path, said local pressure profile being determined as a function of required critical shear over at least said part of the flow path.

11. A method according to claim 9, wherein the flow path of the polymer melt is modified as a function of local pressure profile over at least part of the flow path, and wherein the polymer melt is converted at a given processing temperature, wherein said processing temperature is higher than the crystallization temperature of the polymer resin at ambient pressure as determined from the corresponding PVT graph of the resin, and wherein said local pressure profile applied on the polymer melt is selected to increase the crystallization temperature towards or preferably to at least the given melt processing temperature.

12. A method according to claim 1 comprising injecting or extruding a molten polypropylene based polymer for converting it into a semi-final shape, wherein the polymer melt is converted at a given local pressure and a given processing temperature, wherein said processing temperature is higher than the crystallization temperature of the polymer resin at ambient pressure as determined from the corresponding PVT graph of the resin, and wherein said local pressure applied on the polymer melt is selected to increase the crystallization temperature towards or preferably to at least the given melt processing temperature.

13. A method according to claim 12, wherein said given processing temperature is within a range of 5 to 40° C. higher than the crystallization temperature of the polymer resin at ambient pressure as determined from the corresponding PVT graph of the resin.

14. A method according to claim 12, wherein the applied local pressure is selected within a range of 0 to 500 MPa to increase the crystallization temperature of the polymer melt towards or preferably to at least the given melt processing temperature.

15. A method for manufacturing a polymer article comprising injecting or extruding a molten polyethylene based polymer in a flow path for converting it into a semifinal shape, said polymer having an applied Weissenberg number of at least 0.125 for extruding and at least 0.375 for injecting and a Deborah number of at least 0.25 for extruding and at least 0.75 for injecting, wherein the polyethylene based polymer has a MFR between at least 0.08 and 25 g/10 min.

16. A method according to claim 15 comprising selectively modifying the flow path of the molten semi-crystallizable polymer within the hot runner system, or within the extruder or die.

17. A method according to claim 16, wherein the flow path of the polymer melt is modified as a function of local pressure profile over at least part of the flow path, said local pressure profile being determined as a function of optimized response of the polymer melt to the applied local shear and/or extensional deformation over at least said part of the flow path.

18. A method for manufacturing a polymer article comprising injecting or extruding a molten polyester based polymer in a flow path for converting it into a semi-final shape, said polymer having an applied Weissenberg number of at least 0.125 for extruding and at least 0.375 for injecting and a Deborah number of at least 0.25 for extruding and at least 0.75 for injecting, wherein the polyester based polymer has a MW between 35000 and 143000 g/mol.

19. A method according to claim 18 comprising selectively modifying the flow path of the molten semi-crystallizable polymer within the hot runner system, or within the extruder or die.

20. A method according to claim 19, wherein the flow path of the polymer melt is modified as a function of local pressure profile over at least part of the flow path, said local pressure profile being determined as a function of optimized response of the polymer melt to the applied local shear and/or extensional deformation over at least said part of the flow path.

* * * * *